United States Patent [19]
Edlinger et al.

[11] Patent Number: 5,516,357
[45] Date of Patent: May 14, 1996

[54] PROCESS FOR PRODUCING CEMENT FROM METALLURGICAL SLAG

[75] Inventors: Alfred Edlinger, Baden; Theo Rey, Aarau, both of Switzerland

[73] Assignee: "Holderbank" Financiere Glarus AG, Glarus, Switzerland

[21] Appl. No.: 307,642

[22] Filed: Sep. 19, 1994

[30] Foreign Application Priority Data

Jan. 26, 1993 [AT] Austria ............ 126/93

[51] Int. Cl.$^6$ ............ C21B 3/08; C04B 5/06
[52] U.S. Cl. ............ 75/434; 106/714; 106/789
[58] Field of Search ............ 75/434; 65/19; 106/789, 714

[56] References Cited

U.S. PATENT DOCUMENTS

| | | | |
|---|---|---|---|
| 2,116,469 | 5/1938 | Karwat | 106/789 |
| 4,141,722 | 2/1979 | Takai et al. | 65/19 |
| 4,268,295 | 5/1981 | Yamamoto et al. | 65/19 |
| 5,255,900 | 10/1993 | Schott | 65/19 |

FOREIGN PATENT DOCUMENTS

| | | |
|---|---|---|
| 1499043 | 10/1967 | France . |
| 2370006 | 6/1978 | France . |
| 2611889 | 9/1977 | Germany . |
| 2912828 | 10/1980 | Germany . |
| 64992 | 9/1973 | Luxembourg . |

OTHER PUBLICATIONS

Database WPI, *Derwent Publications Ltd.*, Section CH, Week 8616, Class L02, AN 86–103768–JP,A,61 048 455, Mar. 10, 1986.

*Chemical Abstracts*, vol. 111, No. 26, Dec. 25, 1989, Abs No. 238614p. Inoe Mamoru & Al: "Manufacture of binders from blast–furnace slags", & JP,A,1 176 250, Jul. 12, 1989.

*Primary Examiner*—Melvyn Andrews
*Attorney, Agent, or Firm*—Cushman, Darby & Cushman

[57] ABSTRACT

In a process for the preparation of cement from metallurgical slags, in which liquid slags from reduction processes and steelworks processes, e.g. blast furnace and converter slag, are mixed together and mixed with lime the procedure is such that in a first cooling phase at temperatures above 1000° C., and preferably above 1200° C., the cooling is slower than in a subsequent second cooling phase and that the solidified product obtained is granulated and/or ground in order to obtain directly cement with improved hydraulic properties, in particular increased final strength.

21 Claims, No Drawings

PROCESS FOR PRODUCING CEMENT FROM METALLURGICAL SLAG

BACKGROUND OF THE INVENTION

1. Field of the Invention

The invention relates to a process for the preparation of cement clinker and special binder qualities with high $\alpha'$-belite contents and a high final strength from metallurgical slags, in which liquid slags from reduction processes (acid slags) and steelworks processes (basic slags), such as blast furnace and converter slag, are mixed together and, if necessary, mixed with lime.

2. Background Information

In addition to conventional Portland cements, slag cements in the narrower sense have already assumed great importance, depending on their concrete properties. Slag cements in the narrower sense are finely ground mixtures of gypsum, clinker and blast furnace slag. Like Portland cements, they contain, as a rule, some gypsum to regulate the binding time, and when the mixture contains less than about 30% blast furnace slag, it is known as iron Portland cement and as blast furnace cement only when there is a higher proportion of blast furnace slag.

On the recovery of iron in the blast furnace or by other metallurgical reduction processes, iron ores, for the most part oxygen compounds of iron, mixed with solid fuels such as coke are heated to temperatures of about 1600° C. When a blast furnace is used for the reduction of iron ores, it is not, as a rule, possible to dispense with coke and thus high-grade carbon-containing material. In other known reduction processes cheaper charge coal may be used, at least in part. The higher sulphur content of the charge coal which is often observed in these cases may, through appropriate management of the slag, be brought at least for the most part into the slag. The oxygen of iron oxide combines in such a reduction process with the carbon of the coke or the charge coal to form $CO_2$ and $CO$ and an iron bath which is separated in liquid form is produced.

Since, however, iron ores contain not only oxygen compounds of iron, but also a series of impurities, the so-called gangue, these impurities, which are predominantly of an argillaceous nature and consist of silicic acid and alumina, must be separated. The melting temperatures of such mixtures of silicic acid and alumina are, as a rule, slightly higher than the melting point of iron, and in order to improve separability an appropriate lowering of the melting point of these mixtures of silicic acid and alumina must therefore already be achieved in the reduction process. For this purpose lime is added to the charge in order to obtain a relatively readily melting mixture of lime, silicic acid and alumina which is in the form of a slag melt and floats on the heavier iron melt. The slag, like the iron, can subsequently by tapped off from time to time.

The lime charge must naturally be selected with the metallurgical parameters taken into account and cannot be adapted solely to the required composition of the slag. Blast furnace slag, however, is a substance very closely related to Portland cement clinker, since Portland cement clinker also has the main components silicic acid and alumina. Portland cement is for the most part richer in lime than blast furnace slag, while admittedly if an attempt was made to add to the slag so much lime that the composition of Portland cement is reached, a distinct rise in the melting point of the mixtures would be obtained, which would greatly hamper the required slag reactions in the blast furnace or would lead to alkaline circulations and charges.

The composition of blast furnace slag concretely obtainable in each case thus depends on the composition of the gangue of the ores and naturally also on the subsidiary components of the lime added. In the blast furnace process, for example, limestones are used which have high dolomite fractions, and thus introduce into the slag magnesium as well as calcium.

Thus, taking into account the circumstance that a relatively low melting point is aimed at, the slag cannot be managed randomly in order to arrive at a suitable clinker which gives a high-grade cement.

In addition to blast furnace slags, converter slags which, in comparison with blast furnace slags, have a much higher iron oxide fraction and metallic iron fraction and in principle have poorer hydraulic properties after the grinding of a corresponding slag clinker also occur in metallurgical processes. Water granulation of converter slag is extremely dangerous on account of the formation of detonating gas ($Fe+H_2O \rightarrow Feo+H_2$). Methods are also known of greatly accelerating the curing behaviour of iron Portland cement or blast furnace cement by specific additives such as quicklime, hydrated lime or gypsum, for example. A sulphate acceleration of blast furnace slag, in particular by supersulphated cement, is characterized by a particularly rapid curing rate.

The use of slag from a LD converter together with blast furnace slag for the purpose of common sintering is known from DE-PS 16 46 685. It was already proposed in DE-OS 26 11 889 to subject smelter waste together with lime to an oxidizing smelting, after which the finished melt may be quenched to a granulate, and, finally, the granulate can be ground to cement with the addition of gypsum. This latter invention in particular, from which the present invention proceeds, here already makes use of the latent heat of the melting, since the smelter waste can be used in a suitable mixture in molten form, for example as blast furnace slag and steelworks slag, together with smelter waste sludges and other additives.

SUMMARY OF INVENTION

The object of the invention is now to provide a process of the aforementioned type, in which, making thermal use of the latent heat of the processes normally taking place in a steelworks, the quality of the obtainable clinker can be influenced to such an extent that cement or special binders with improved hydraulic properties can be obtained directly.

DETAILED DESCRIPTION OF THE INVENTION

To solve this problem, taking as a starting point the aforementioned process, it is proposed that cooling should be effected more slowly in a first cooling phase at temperatures above 1000° C., and preferably above 1200° C., than in a subsequent second phase and that the solidified product obtained should be granulated and/or ground. Through the fact that, after setting the required mixture ratios in the melt, utilizing the latent heat of the liquid slag occurring in the blast furnace or steelworks, cooling is first effected more slowly in a first cooling phase, the possibility is created of forming to a greater extent during cooling the phases required for the hydraulic properties, in particular the alite and belite phases, and especially bredigite, and forcing a corresponding growth of crystals. The high iron oxide content in particular leads during the preparation of special binders to the highest-quality α'-belite phase, only blast furnace slag being mixed with steelworks slag in this case. It is not until after a period of holding at temperatures above 1000° C., and preferably above 1200° C., that cooling is effected more rapidly, after which the solidified product obtained is granulated and/or ground. With such a procedure, moreover, the advantage is obtained that air may be used as cooling medium in this first cooling phase and heating may accordingly be effected in such a way that a directly usable latent heat can be made available for a combustion process in the form of preheated combustion air. In addition, through this first delayed cooling, further cooling, especially granulation, is greatly simplified. With appropriate cooling in the first phase, in which air enriched with $O_2$ may be used for cooling, it is possible to carry out cooling with far less risk, subsequently even in water, since all metallic iron dispersed in the steelworks slag was oxidized and hence no detonation gas can be formed with water, on account of which a very fine dispersion and thus a simplification of the subsequent grinding process can be achieved.

Through the much higher initial temperature due to the use of liquid slags, the process in accordance with the invention may to advantage be applied in such a way that undesirable excesses of alkali are eliminated. Through the admixture of components with higher Ca contents the alkalis are displaced by the following mechanisms:

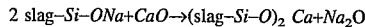

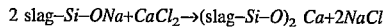

$Na_2O$ and/or NaCl evaporate at the temperatures prevailing.

$Na_2O$ and/or $K_2O$, with a possibly increased $CO_2$ pressure above the slag melt, react to potash or soda to possibly marketable products.

For this purpose chlorides and/or chlorine-containing waste materials may be added to advantage to the melt, by which means alkali chlorides, but also heavy metal chlorides, are successfully expelled and can be precipitated and separated in an appropriate gas scrubbing operation. Chlorides may here be used in the first place as calcium chlorides. Such a reduction of the sodium and potassium contents may greatly improve the quality of the cement that can be obtained and reduces the undesirable alkali-aggregate reaction.

In order to bring the molten slag from the blast furnace and other steelworks processes, such as a LD converter, to the correspondingly required high temperature, the exothermal reaction with the lime to be added may be utilized, when the procedure is conveniently such that the melt is brought to temperatures above 1700° C. by exothermal reaction with calcium oxide, through which mixing and homogenization is greatly facilitated. When LD and blast furnace slag are mixed, there is already an enormous mixture enthalpy on account of the different basicities ($CaO/SiO_2$ ratio). The mixture temperature in this case rises to about 1900° C., which already leads to at least partial calcination (expulsion of $CO_2$) of the limestone possibly added. The viscosity of the melt may here be conveniently reduced by the addition of $CaF_2$.

A particularly convenient clinker for subsequent grinding to cement may be obtained when the blast furnace and converter slag melts are used in the ratio of from 30 to 80% by weight blast furnace slag to 20 to 70% by weight converter slag.

It is of advantage for the first retarded cooling to take place in the first cooling phase in air, using a fan blower, by which means the oxidation of free iron with the formation of fayalite and/or ferrite phases and a preliminary comminution is obtained. Following the first cooling phase cooling may conveniently be carried out with steam and/or water, when, in view of the much lower temperature, this process may be applied extremely safely.

For the reliable development of *the required structural composition and the required crystal structures in the melt clinker it is of advantage for the melt clinker to be passed to a fluidized bed or cascade of fluidized beds and to be cooled with 1.5 to 3.5 $Nm^3/kg$ cooling air over a period of 15 to 40 minutes, and preferably 25 to 30 minutes, with solidification to clinker granules with a diameter of less than 4 mm, and preferably about 2.5 mm, while, in order to improve the energy balance, the cooling air drawn off at temperatures between 900° C. and 1100° C. is used to advantage as preheated combustion air.

The process in accordance with the invention is explained in greater detail below by means of an embodiment.

30 tonnes of blast furnace slag in the molten state were mixed with 20 tonnes of LD slag, a temperature of about 1800° C. being obtained by the addition of a $CaO/CaCO_3$ mixture. After intensive mixing the melt was directed by means of a fan blower and cooled in air over a period of 30 minutes, through which the development of the required crystal structures was brought about. After this first cooling, further cooling was effected with steam. The cement had the following composition (% by weight):

| | |
|---|---|
| $Al_2O_3$ | 5.51% |
| MgO | 1.15% |
| $SiO_2$ | 21.9% |
| CaO | 65.7% |
| $Fe_2O_3$ | 3.0% |
| $Mn_2O_3$ | 0.12% |
| $SO_3$ | 0.14% |
| $P_2P_5$ | 0.49% |
| $K_2O$ | 0.60% |
| $Na_2O$ | 0.72%. |

In a further embodiment (bredigite clinker preparation) 15 tonnes of LD slag at 1600° C. were mixed with 8 tonnes of blast furnace slag at 1500° C. in order to prepare a special binder without the addition of lime. The mixture temperature rose to about 1900° C. The relevant chamical analysis was:

| | |
|---|---|
| $SiO_2$ | 22.1% |
| $Al_2O_3$ | 5.5% |
| $Fe_2O_3$ | 15.2% |
| CaO | 43.7% |
| MgO | 5.8% |
| $SO_3$ | 1.1% |
| $K_2O$ | 0.17% |
| $Na_2O$ | 0.05% |
| $TiO_2$ | 0.38% |
| $Mn_2O_3$ | 4.5% |
| $P_2O_5$ | 0.59% |

Semi-quantitative mineralogical analysis gave the following phases:

| | |
|---|---|
| ≅ 10% wustite | (FeO) |
| ≅ 50% bredigite | (α'-belite) |
| the remainder is amorphous (glass). | |

It was found that the mixture ratios given above are optimal for the preparation of bredigite clinker. In any case, the $Fe_2O_3$ content should be more than 10% by weight, since this stabilizes the metastable α'-belite (bredigite). Bredigite is, in fact, that form of belite which, in pure form, is stable only up to 1450° C., but below this is metastable and readily decomposes. It could be found that a relatively high $Fe_2O_3$ content stabilizes the bredigite phase. $P_2O_5$ has a similar effect. Bredigite represents the most valuable form of belite from the point of view of cement technology.

We claim:

1. Process for the preparation of cement from metalurgical slags comprising mixing together liquid slags from reduction processes and steelworks processes to form a melt, said liquid slags comprising lime, silicic acid and alumina, and said melt having a temperature greater than 1000° C.;

cooling said melt by carrying out a first cooling phase at temperatures above 1000° C.;

further cooling said melt by carrying out a second, more rapid cooling phase at temperatures below 1000° C., so that a solidified product is obtained that is granulated and/or ground.

2. Process according to claim 1 further comprising raising the temperature of the melt above 1700° C. by addition of CaO prior to the first cooling phase, thereby producing an exothermal reaction.

3. Process according to claim 1, wherein the weight to weight ratio of reduction process slag to steelworks process slag is between 30/70 and 80/20.

4. Process according to claim 1 further comprising using a fan blower to effect cooling in the first cooling phase.

5. Process according to claim 1 further comprising contacting the melt with steam and/or water to effect cooling after the first cooling phase.

6. Process for the preparation of cement from metalurgical slags comprising mixing together liquid slags from reduction processes and steelworks processes to form a melt, said liquid slags comprising lime, silicic acid and alumina, and said melt having a temperature greater than 1000° C.;

adding chlorides to said melt;

cooling said melt by carrying out a first cooling phase at temperatures above 1000° C.;

further cooling said melt by carrying out a second, more rapid cooling phase at temperatures below 1000° C., so that a solidified product is obtained that is granulated and/or ground.

7. Process according to claim 6, further comprising raising the temperature of the melt above 1700° C. by addition of CaO prior to the first cooling phase, thereby producing an exothermal reaction.

8. Process according to claim 6, wherein the weight to weight ratio of reduction process slag to steelworks process slag is between 30/70 and 80/20.

9. Process according to claim 6 further comprising using a fan blower to effect cooling in the first cooling phase.

10. Process for the preparation of cement from metalugical slags comprising mixing together liquid slags from reduction processes and steelworks processes to form a melt, said liquid slags comprising lime, silicic acid and alumina, and said melt having a temperature greater than 1000° C.;

reducing the viscosity of the melt by the addition of $CaF_2$;

cooling said melt by carrying out a first cooling phase at temperatures above 1000° C.;

further cooling said melt by carrying out a second, more rapid cooling phase at temperatures below 1000° C., so that a solidified product is obtained that is granulated and/or ground.

11. Process according to claim 10 further comprising using a fan blower to effect cooling in the first cooling phase.

12. Process according to claim 10 further comprising adding chlorides to the melt.

13. Process according to claim 12 further comprising raising the temperature of the melt above 1700° C. by addition of CaO prior to the first cooling phase, thereby producing an exothermal reaction.

14. Process according to claim 13 further comprising contacting the melt with steam and/or water to effect cooling after the first cooling phase.

15. Process according to claim 13, wherein the weight to weight ratio of reduction process slag to steelworks process slag is between 30/70 and 80/20.

16. Process according to claim 15 further comprising using a fan blower to effect cooling in the first cooling phase.

17. Process according to claim 16 further comprising contacting the melt with steam and/or water to effect cooling after the first cooling phase.

18. Process for the preparation of cement from metalurgical slags comprising mixing together liquid slags from reduction processes and steelworks processes to form a melt, said liquid slags comprising lime, silicic acid and alumina, and said melt having a temperature greater than 1000° C.;

cooling said melt by carrying out a first cooling phase at temperatures above 1000° C.;

passing said melt to a fluidized bed or a fluidized bed cascade and cooling with 1.5 to 3.5 $Nm^3$/kg clinker cooling air over a period of 15 to 45 minutes so that said melt solidifies to clinker granules having a diameter of less than 4 mm.

19. Process according to claim 18 additionally comprising using cooling air drawn off at temperatures between 900° C. and 1100° C. as preheated combustion air.

20. Process according to claim 18 additionally comprising using a fan blower to effect cooling in the first cooling phase.

21. Process according to claim 18 wherein the weight to weight ratio of reduction process slag to steelworks process slag is between 30/70 and 80/20.

* * * * *

UNITED STATES PATENT AND TRADEMARK OFFICE
CERTIFICATE OF CORRECTION

PATENT NO. : 5,516,357
DATED : May 14, 1996
INVENTOR(S) : EDLINGER et al.

It is certified that error appears in the above-identified patent and that said Letters Patent is hereby corrected as shown below:

On the title page, the following items should read --

| [22] | PCT Filed: | Jan. 26, 1994 |
|---|---|---|
| [86] | PCT No.: | PCT/AT94/00006 |
|  | § 371 Date: | Sept. 19, 1994 |
|  | § 102(e) Date: | Sept. 19, 1994 |
| [87] | PCT Pub. No.: | WO94/17006 |
|  | PCT Pub. Date: | Aug. 4, 1994 --|

Signed and Sealed this

Seventeenth Day of September, 1996

Attest:

BRUCE LEHMAN

*Attesting Officer*   *Commissioner of Patents and Trademarks*